(12) United States Patent
Arai

(10) Patent No.: US 10,879,640 B2
(45) Date of Patent: Dec. 29, 2020

(54) TERMINAL STRUCTURE

(71) Applicant: Toyota Jidosha Kabushiki Kaisha, Toyota (JP)

(72) Inventor: Kunihiko Arai, Owariasahi (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 16/578,843

(22) Filed: Sep. 23, 2019

(65) Prior Publication Data
US 2020/0099157 A1 Mar. 26, 2020

(30) Foreign Application Priority Data

Sep. 25, 2018 (JP) ................. 2018-178905

(51) Int. Cl.
*H01R 13/187* (2006.01)
*H01R 13/10* (2006.01)
*B60L 53/16* (2019.01)
*H01R 13/502* (2006.01)

(52) U.S. Cl.
CPC ............ *H01R 13/187* (2013.01); *B60L 53/16* (2019.02); *H01R 13/10* (2013.01); *H01R 13/502* (2013.01); *H01R 2201/26* (2013.01)

(58) Field of Classification Search
CPC .............................. H01R 13/187; H01R 13/10
USPC ........................................................ 439/843
See application file for complete search history.

(56) References Cited

U.S. PATENT DOCUMENTS

| | | | | |
|---|---|---|---|---|
| 1,349,405 A * | 8/1920 | Brown | ...................... | B61G 5/10 307/9.1 |
| 2,393,083 A * | 1/1946 | Wizegarver | .................... | 439/268 |
| 2,521,722 A * | 9/1950 | Hubbell | ................. | H01R 13/33 439/788 |
| 3,350,681 A * | 10/1967 | Benoit | ................. | H01R 13/193 439/837 |
| 3,380,012 A * | 4/1968 | Moulin | ................. | H01R 13/111 439/436 |
| 3,689,866 A * | 9/1972 | Kelly | ...................... | B60T 11/20 439/586 |
| 3,829,820 A * | 8/1974 | Hubner | ................. | H01R 13/193 439/848 |
| 4,128,293 A * | 12/1978 | Paoli | .................... | H01R 13/187 439/843 |
| 4,591,222 A * | 5/1986 | Shaffer | .................. | H01R 12/87 439/265 |
| 4,720,157 A * | 1/1988 | Nestor | ................. | H01R 13/187 439/843 |

(Continued)

FOREIGN PATENT DOCUMENTS

| JP | 2008-135275 A | 6/2008 |
|---|---|---|
| JP | 2014-143023 A | 8/2014 |
| JP | 2017-079102 A | 4/2017 |

*Primary Examiner* — Neil Abrams
(74) *Attorney, Agent, or Firm* — Dinsmore & Shohl LLP

(57) ABSTRACT

Provided is a terminal structure in which a first terminal is insertable in a second terminal. The first terminal includes a pin and a first rotor provided at an end of the pin. The second terminal includes a female pin, a hollow elastic member rotatable along the inner circumferential face of the receptacle in the female pin, and a second rotor provided at an end of the elastic member. The second rotor and the elastic member are configured to rotate circumferentially when the first rotor is moved in the insertion direction.

2 Claims, 8 Drawing Sheets

(56) References Cited

U.S. PATENT DOCUMENTS

| | | | | |
|---|---|---|---|---|
| 4,786,262 A | * | 11/1988 | Molitor | H01R 13/187 |
| | | | | 439/843 |
| 4,895,530 A | * | 1/1990 | Gugelmeyer | H01R 13/623 |
| | | | | 439/311 |
| 5,667,413 A | * | 9/1997 | Trafton | H01R 13/187 |
| | | | | 439/271 |
| 5,735,716 A | * | 4/1998 | Bilezikjian | H01R 13/187 |
| | | | | 439/843 |
| 6,062,919 A | * | 5/2000 | Trafton | H01R 13/187 |
| | | | | 439/843 |
| 9,601,845 B2 | * | 3/2017 | Ando | H01R 4/5008 |
| 10,218,103 B2 | * | 2/2019 | Ostermann | H01R 13/04 |
| 2020/0099157 A1 | * | 3/2020 | Arai | H01R 13/187 |

* cited by examiner

TERMINAL STRUCTURE

CROSS REFERENCE TO RELATED APPLICATIONS

This nonprovisional application claims priority to Japanese Patent Application No. 2018-178905 filed on Sep. 25, 2018 with the Japan Patent Office, the entire contents of which are hereby incorporated by reference.

BACKGROUND

Field

The present disclosure relates to a terminal structure.

Description of the Background Art

Various types of terminal structure where a male terminal and a female terminal are connected together to allow electrical conduction have been conventionally proposed.

For example, a terminal described in Japanese Patent Laying-Open No. 2017-079102 includes a terminal body and a plurality of contact spring pieces formed in the terminal body.

The terminal body has an insertion opening at its upper end for a pin to be inserted therethrough. The terminal body has a hollow engagement space therein. The contact spring pieces extend from the inner wall surface of the terminal body toward the inside of the engagement space. When a pin is inserted through the insertion opening, the contact spring pieces come in contact with the pin at a plurality of points.

Since the plurality of contact spring pieces come in contact with the pin at a plurality of points, an electric current flowing between the terminal and the pin is divided, thus reducing the generation of heat.

A terminal for a connector described in Japanese Patent Laying-Open No. 2014-143023 includes a terminal body and an elastic contact maker. The terminal body has a cylindrical shape and includes a hollow receptacle portion therein in which a male terminal is inserted.

The elastic contact maker has a spiral shape and is attached to the inner circumferential face of the receptacle portion. This elastic contact maker is movable in the circumferential direction of the inner circumferential face of the receptacle portion.

SUMMARY

In the terminal described in Japanese Patent Laying-Open No. 2017-079102, the contact spring pieces are fixed to the terminal body. Thus, whenever a pin is inserted and extracted, the pin comes in contact with the contact spring pieces at the same points. As a result, if the same pin is inserted and extracted repeatedly, the pin easily wears at the points in contact with the contact spring pieces.

In Japanese Patent Laying-Open No. 2014-143023, the elastic contact maker is movable in the circumferential direction of the receptacle portion. However, a foreign substance or the like entering the receptacle portion may prevent the elastic contact maker from rotating when the male terminal is inserted into the receptacle portion. Also, in this case, whenever the male terminal is inserted and extracted, the male terminal comes in contact with the elastic contact maker at the same points. Thus, repeated insertion and extraction disadvantageously causes wear on the contact points on the male terminal and the elastic contact maker.

The present disclosure has been made in view of the above-described problems. An object of the present disclosure is to provide a terminal structure that can reduce wear on a male terminal and a female terminal even with repeated insertion and extraction of the male terminal to and from the female terminal.

A terminal structure according to the present disclosure is a terminal structure in which a first terminal is insertable in a second terminal. The first terminal includes a pin, and a first rotor provided at an end of the pin. The second terminal includes a female pin including a receptacle in which the pin is insertable, a hollow elastic member contained in the receptacle and rotatable along the inner circumferential face of the receptacle, and a second rotor provided at an end of the elastic member.

The pin and the first rotor are configured to be inserted in the elastic member when the pin and the first rotor are moved in the insertion direction. The first rotor has an outer circumferential face including a first contact face extending along the circumferential face of the first rotor as the first contact face extends in the insertion direction. The second rotor includes a second contact face configured to come in contact with the first contact face. The first contact face is configured to come in contact with the second contact face when the pin and the first rotor are moved in the insertion direction. The second rotor and the elastic member are configured to rotate circumferentially when the first rotor is moved in the insertion direction while the first contact face and the second contact face are in contact with each other.

According to the terminal structure, when the pin is inserted in the female pin, the elastic member rotates. Thus, whenever the pin is inserted in the female pin, the contact points between the elastic member and the pin vary in position. This can prevent wear on particular points on the circumferential face of the pin.

The second rotor has a ring shape. The second contact face is formed on the inner circumferential face of the second rotor. The second rotor is configured to deform to stretch when the pin is inserted therein. While the pin is inserted in the second rotor, a gap is defined between the second rotor and the inner circumferential face of the female pin.

According to the terminal structure, during the rotation of the first rotor, the first rotor is not in contact with the inner circumferential face of the female pin. This can minimize the force required for rotating the first rotor.

The foregoing and other objects, features, aspects and advantages of the present disclosure will become more apparent from the following detailed description of the present disclosure when taken in conjunction with the accompanying drawings.

DETAILED DESCRIPTION

With reference to FIG. 1 to FIG. 11, a terminal structure according to the present embodiment is described. Among the components shown in FIG. 1 to FIG. 11, identical or substantially identical components are identically denoted, and redundant explanation is not provided. The components recited in the claims may be written in parentheses along with the corresponding components recited in the embodiment.

Figure 1:
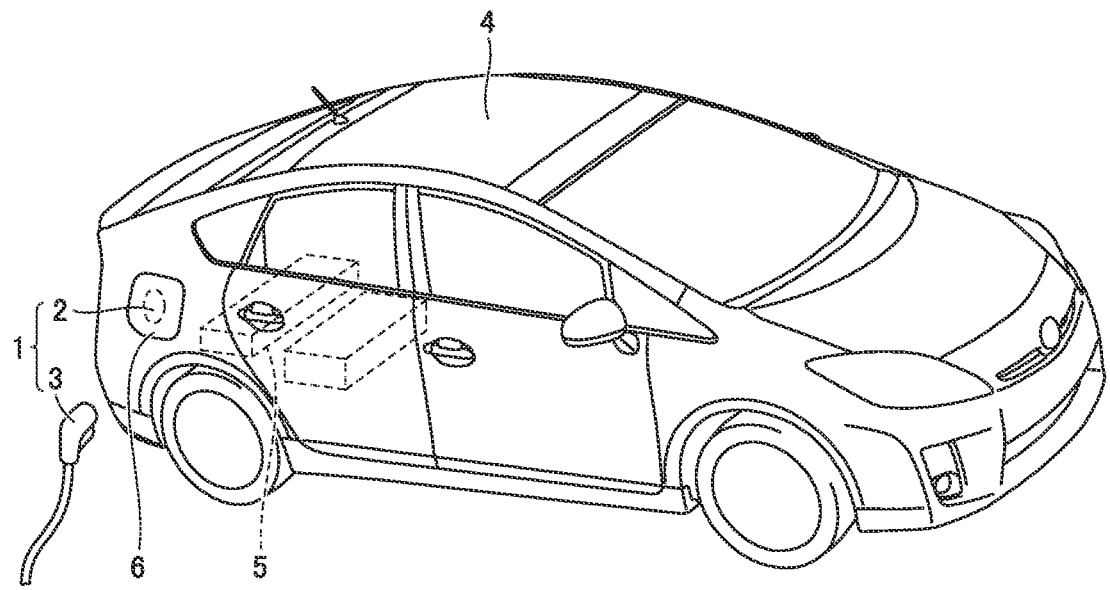
FIG. 1 is a perspective view showing a connector 2 and a plug 3 having a terminal structure 1 according to the present embodiment.

FIG. 1 is a perspective view showing connector 2 and plug 3 having terminal structure 1 according to the present embodiment.

Terminal structure 1 includes connector 2 and plug 3 to be inserted in connector 2. Connector 2 is mounted on a vehicle 4, and plug 3 is provided in a charging station (not shown).

Vehicle 4 includes a battery 5 and a cover 6. Cover 6 is provided on the outer surface of vehicle 4. When cover 6 is opened, connector 2 is exposed to the outside.

When plug 3 is connected to connector 2, electric power is supplied from plug 3 to battery 5 through connector 2.

Figure 2:
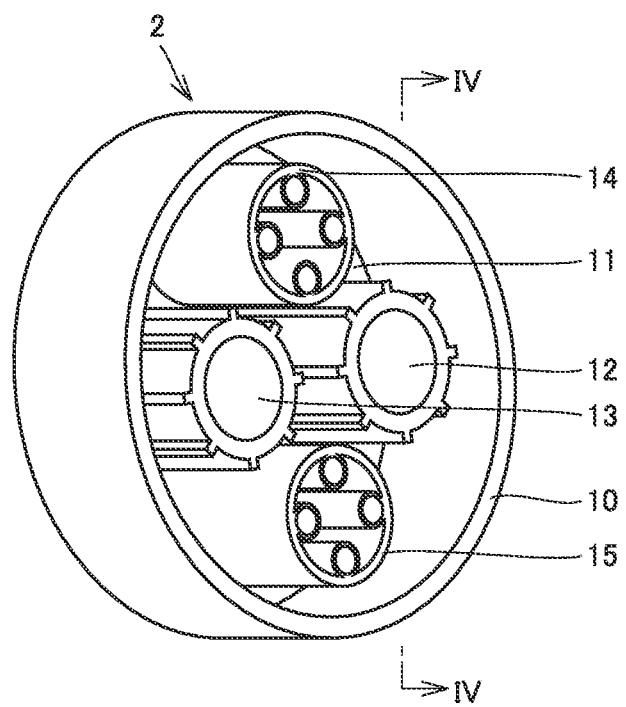
FIG. 2 is a perspective view showing connector 2.

FIG. 2 is a perspective view showing connector 2. Connector 2 includes an outer circumferential wall 10, a bottom board 11, power terminals (second terminal) 12, 13, and communication terminals 14, 15. Outer circumferential wall 10 has a ring shape, and bottom board 11 covers one end of outer circumferential wall 10.

Power terminals 12, 13 and communication terminals 14, 15 are contained in the space defined by outer circumferential wall 10 and bottom board 11. Communication terminals 14, 15 include a plurality of female terminals therein.

Figure 3:
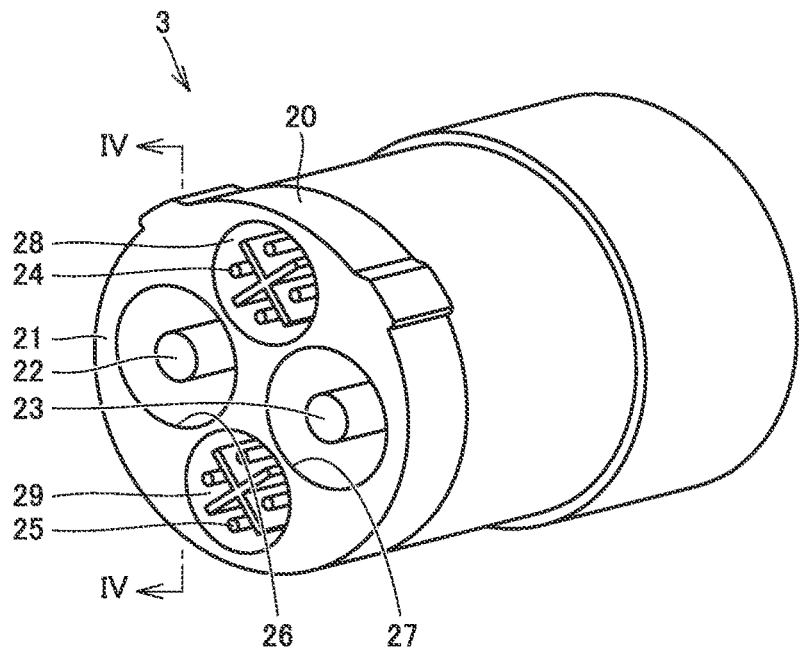
FIG. 3 is a perspective view showing a part of plug 3.

FIG. 3 is a perspective view showing a part of plug 3. Plug 3 includes a head 20; and power pins (first terminal) 22, 23, a plurality of communication pins 24, and a plurality of communication pins 25 provided adjacent to an end face 21 of head 20. End face 21 of head 20 has a plurality of recesses 26, 27, 28, 29.

Power pins 22, 23 are respectively disposed in recesses 26, 27, and communication pins 24, 25 are respectively disposed in recesses 28, 29.

Figure 4:
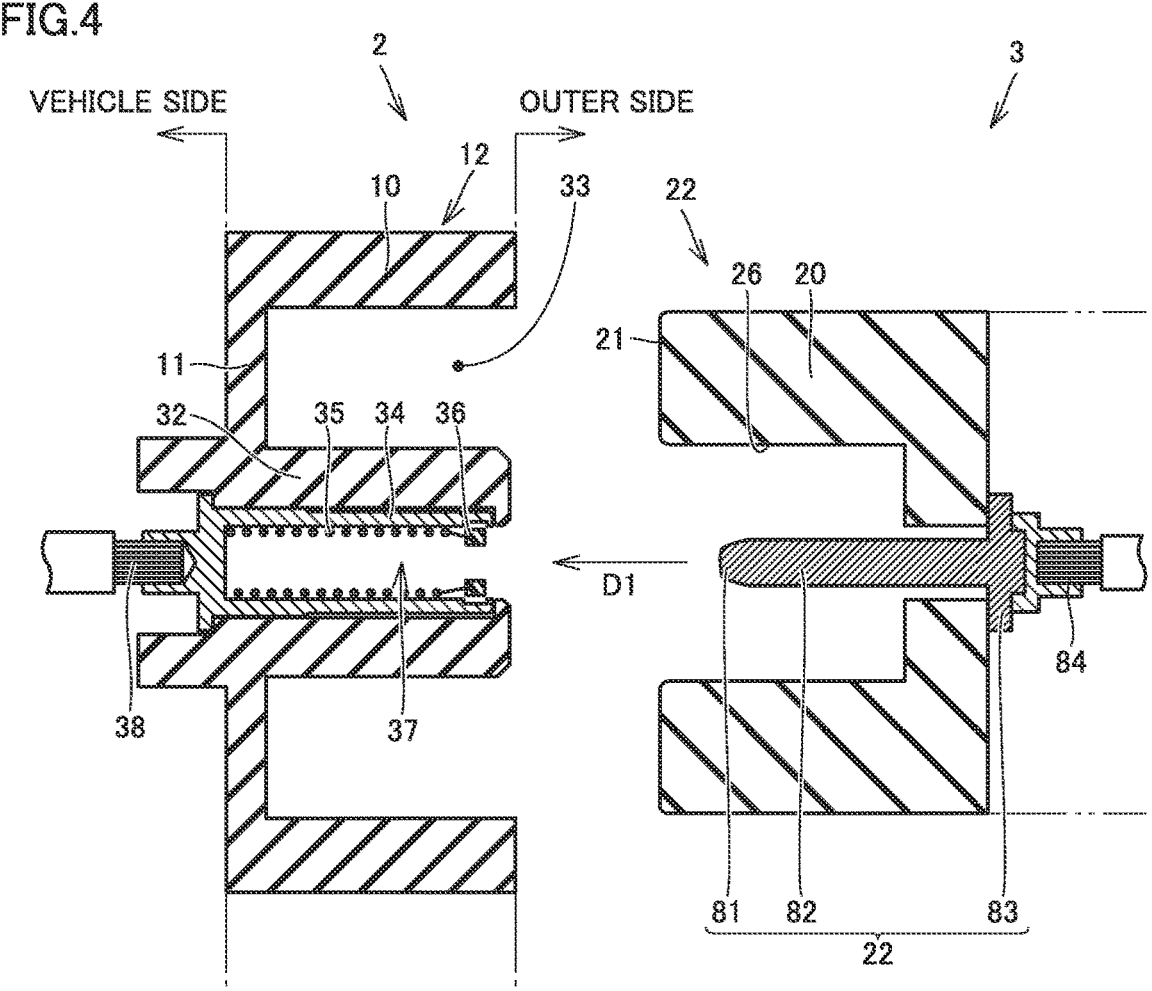
FIG. 4 is a cross-sectional view showing a configuration around a power terminal 12 and a power pin 22, with connector 2 and plug 3 close to each other.

FIG. 4 is a cross-sectional view showing a configuration around power terminal 12 and power pin 22, with connector 2 and plug 3 close to each other. Specifically, FIG. 4 shows a cross section taken along line IV-IV in FIG. 2, and a cross section taken along line IV-IV in FIG. 3.

Plug 3 includes head 20, and power pin 22 disposed in recess 26 defined in head 20.

Head 20 is made of an insulating material. Power pin 22 includes a rotor (first rotor) 81, a pin 82, and a rear end 83. Where the direction in which power pin 22 is inserted into power terminal 12 of connector 2 is defined as an insertion direction D1, rotor 81 is at the leading end of power pin 22 in insertion direction D1. Rear end 83 is on the side opposite to rotor 81 and protrudes from head 20. Rear end 83 is connected with a power line 84. A gap is defined between power pin 22 and the inner circumferential face of recess 26.

Power terminal 12 of connector 2 includes an inner cylinder 32, a female pin 34, an elastic member 35, and a rotor (second rotor) 36.

Inner cylinder 32 is spaced from outer circumferential wall 10. Between inner cylinder 32 and outer circumferential wall 10, an insertion space 33 is defined.

Inner cylinder 32 is made of an insulating material and is hollow. Inner cylinder 32 protrudes from bottom board 11 toward the outer side of the vehicle.

Female pin 34, elastic member 35, and rotor 36 are contained in inner cylinder 32. The end of female pin 34 on the vehicle side protrudes from bottom board 11 to the vehicle side. This end of female pin 34 is connected with a power line 38.

Female pin 34 is hollow, with a space 37 therein. Female pin 34 is made of electrically conductive metallic material.

When plug 3 is connected to connector 2, head 20 is fitted in insertion space 33 of connector 2 and power pin 22 is fitted in female pin 34.

Figure 5:
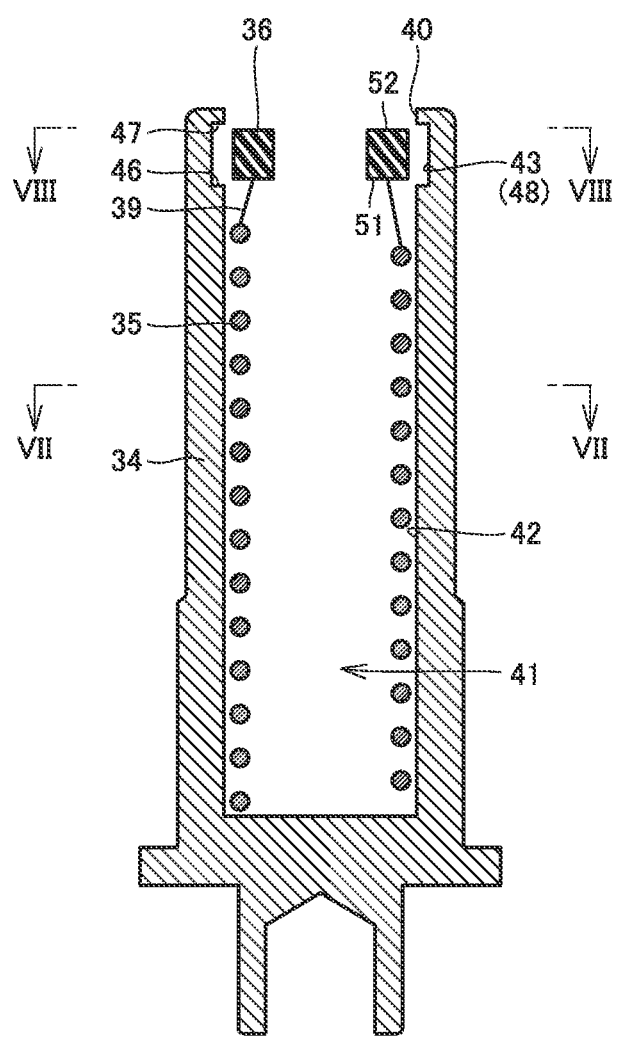
FIG. 5 is a cross-sectional view showing a female pin 34 and other components.

FIG. 5 is a cross-sectional view showing female pin 34 and other components. Female pin 34 has an insertion opening 40 at its end. Female pin 34 includes a receptacle space 41 communicating with insertion opening 40.

Elastic member 35 and rotor 36 are inserted in receptacle space 41 and are connected to each other via connecting member 39.

The inner circumferential face of female pin 34 includes a cylindrical face 42 with elastic member 35 thereon, a retraction face 43 larger than cylindrical face 42 in diameter, and inner end faces 46, 47.

A ring-shaped recess 48 extending in a ring shape is defined by retraction face 43, inner end face 46, and inner end face 47. Ring-shaped recess 48 is located on the insertion opening 40 side relative to cylindrical face 42.

Inner end face 46 connects retraction face 43 and cylindrical face 42 and extends in a ring shape. Inner end face 47 is located on the insertion opening 40 side relative to retraction face 43.

Figure 6:
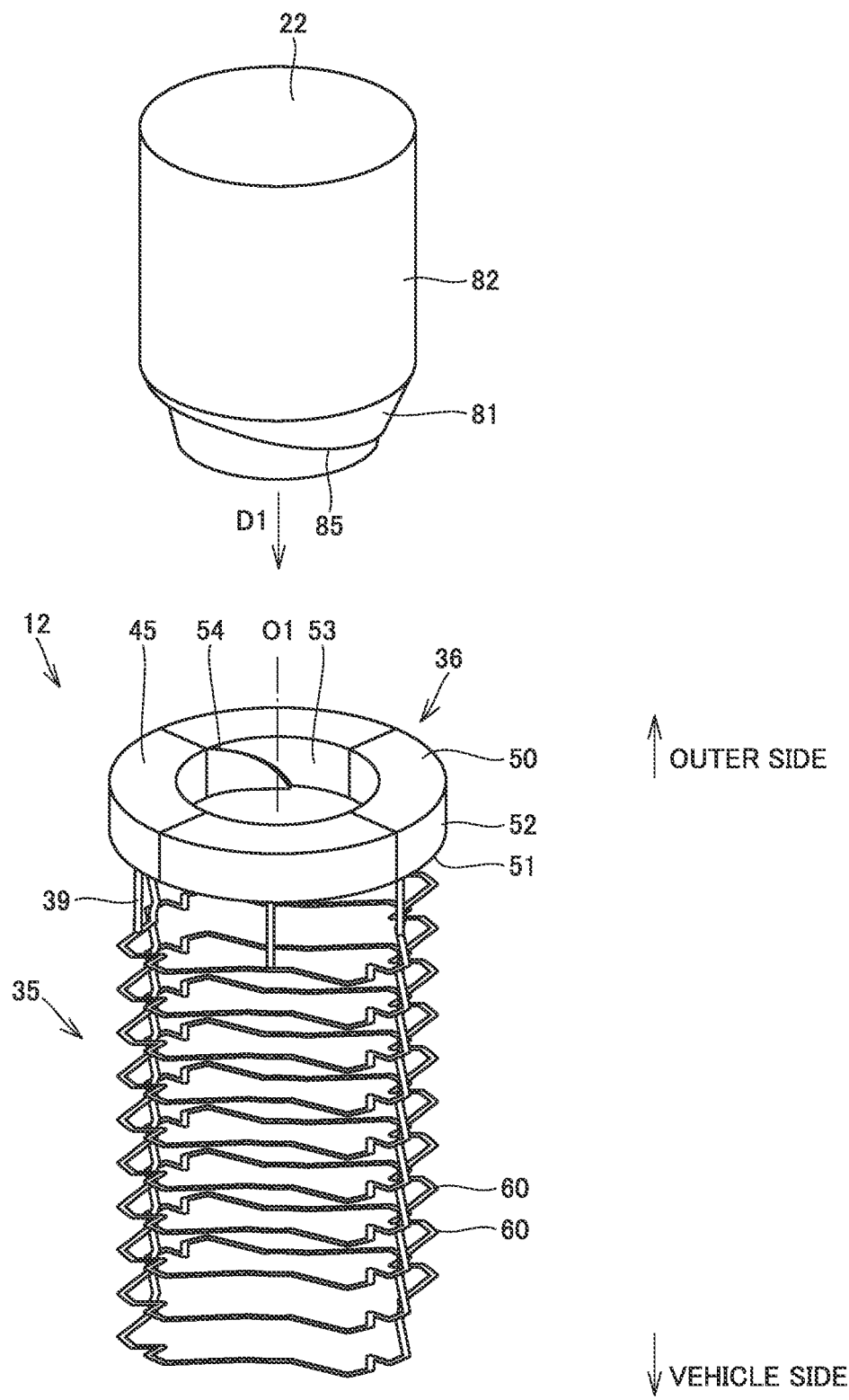
FIG. 6 is a perspective view showing an elastic member 35, a rotor 36, and a connecting member 39.

FIG. 6 is a perspective view showing elastic member 35, rotor 36, and connecting member 39.

Elastic member 35 surrounds center line O1 extending in insertion direction D1. Elastic member 35 is formed by winding a metallic wire, from the vehicle side to the outer side. In other words, elastic member 35 is formed by successively connected unit rings 60 each of which is one wind surrounding center line O1. The metallic wire that forms elastic member 35 is an electrically conductive material, and elastic member 35 is electrically conductive.

In FIG. 6, rotor 36 is provided at an end of elastic member 35. Rotor 36 has a ring shape and includes a plurality of divisions 45 circumferentially arranged.

Connecting member 39 connects divisions 45 to the end of elastic member 35. Each connecting member 39 is an elastic member. An urging force from each connecting member 39 brings divisions 45 circumferentially in contact with each other.

Rotor 36 has a ring shape, with divisions 45 being in contact with each other. In this state, rotor 36 includes end faces 50, 51, an outer circumferential face 52, an inner circumferential face 53, and a contact face (second contact face) 54. End face 50 is located on the outer side, and end face 51 is located on the vehicle side.

Contact face 54 is formed on inner circumferential face 53. Contact face 54 extends in the circumferential direction of rotor 36 as contact face 54 extends from end face 50 toward end face 51.

The direction from end face 50 toward end face 51 is insertion direction D1. Contact face 54 extends along inner circumferential face 53 as contact face 54 extends in insertion direction D1.

Rotor 81 of power pin 22 tapers as rotor 81 extends in insertion direction D1. Rotor 81 has a circumferential face including a contact face (first contact face) 85. Contact face 85 extends in the circumferential direction of rotor 81 as contact face 85 extends in insertion direction D1.

The outside diameter of rotor 81 at its leading end in insertion direction D1 is smaller than the inside diameter of inner circumferential face 53. However, the outside diameter of rotor 81 increases toward pin 82. The outside diameter of pin 82 is larger than the inside diameter of inner circumferential face 53.

Figure 7:
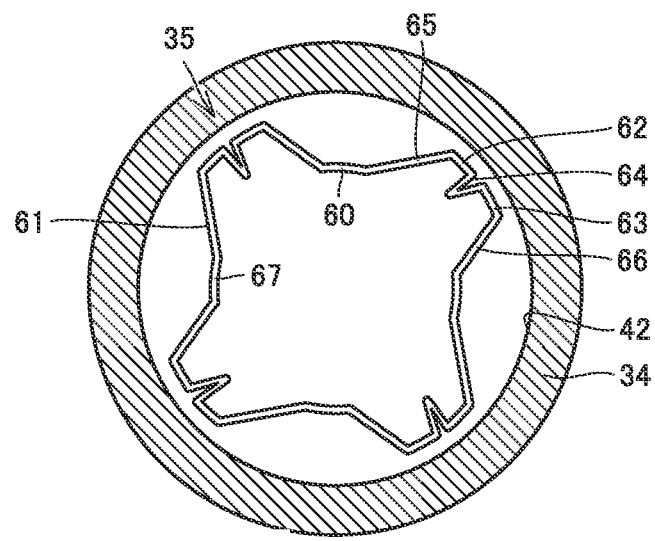
FIG. 7 is a cross-sectional view taken along line VII-VII shown in FIG. 5.

FIG. 7 is a cross-sectional view taken along line VII-VII shown in FIG. 5.

Each unit ring 60 of elastic member 35 includes a plurality of inside arc-shaped portions 67 and a plurality of projecting portions 61. The plurality of inside arc-shaped portions 67 are in the shape of a circular arc and provided at intervals. Each projecting portion 61 connects adjacent inside arc-shaped portions 67, and protrudes outward relative to inside arc-shaped portions 67.

Each projecting portion 61 includes an outside arc-shaped portion 62, an outside arc-shaped portion 63, a narrow portion 64, and leg portions 65, 66.

Outside arc-shaped portions 62, 63 are in the shape of a circular arc and extend along cylindrical face 42 of female pin 34. When power pin 22 of plug 3 shown in FIG. 3 is not inserted in elastic member 35, outside arc-shaped portions 62, 63 are separated from cylindrical face 42 of female pin 34.

Narrow portion 64 connects one end of outside arc-shaped portion 62 and one end of outside arc-shaped portion 63. Narrow portion 64 protrudes radially inward.

Leg portion 65 connects the other end of outside arc-shaped portion 62 and one end of inside arc-shaped portion 67. Leg portion 66 connects the other end of outside arc-shaped portion 63 and the other end of inside arc-shaped portion 67.

Figure 8:
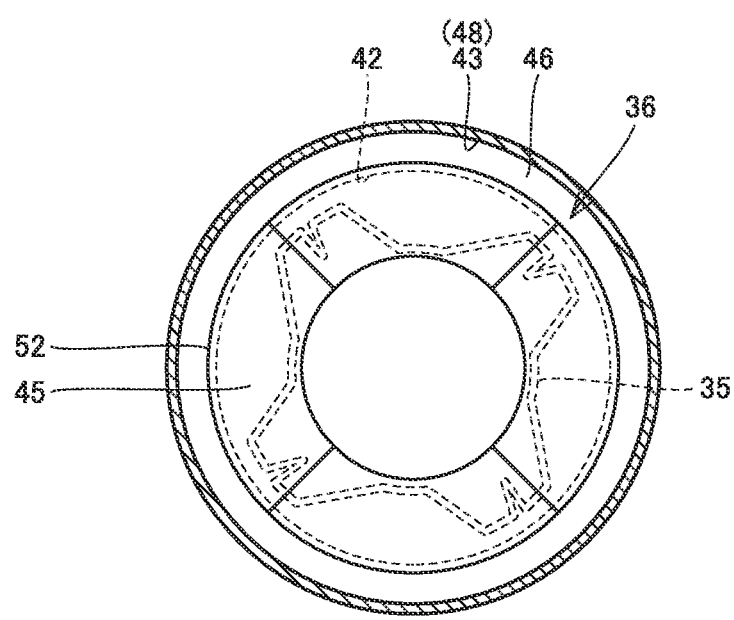
FIG. 8 is a cross-sectional view taken along line VIII-VIII shown in FIG. 5.

FIG. 8 is a cross-sectional view taken along line VIII-VIII shown in FIG. 5. In the state shown in FIG. 8, rotor 36 has a ring shape, with divisions 45 being circumferentially in contact with each other.

As shown in FIG. 8, the outside diameter of outer circumferential face 52 is larger than the inside diameter of cylindrical face 42, and the circumference of rotor 36 is contained in ring-shaped recess 48.

With divisions 45 being in contact with each other, a gap is defined between outer circumferential face 52 of rotor 36 and retraction face 43.

In connector 2 and plug 3 configured as described above, the movement of each member at the time when plug 3 is connected to connector 2 is described.

In FIG. 6, when power pin 22 is inserted into power terminal 12, power pin 22 moves in insertion direction D1.

The leading end of rotor 81 enters inner circumferential face 53, and contact face 85 comes in contact with contact face 54. When power pin 22 further moves in insertion direction D1 after contact face 85 comes in contact with contact face 54, rotor 36 rotates along contact face 85.

Figure 9:
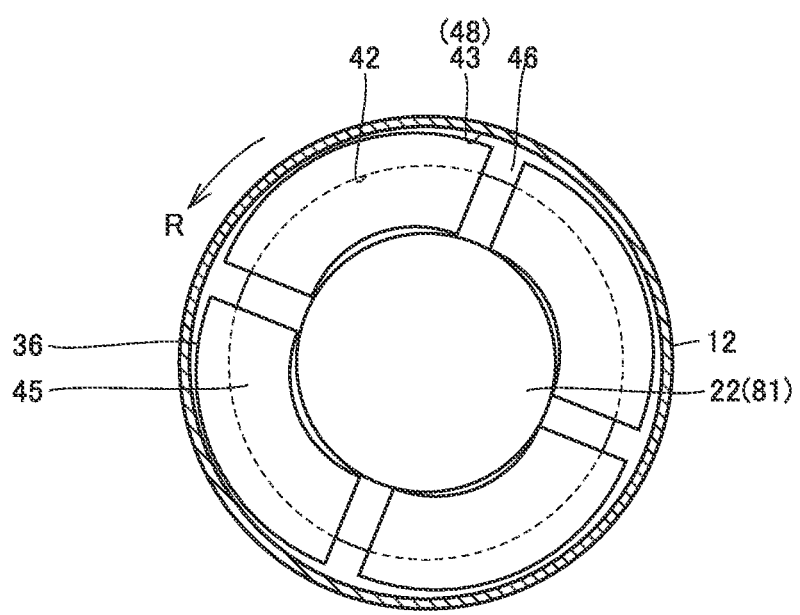
FIG. 9 is a cross-sectional view showing a state in which a rotor 81 is inserted in rotor 36.

FIG. 9 is a cross-sectional view showing a state in which rotor 81 is inserted in rotor 36. As shown in FIG. 9 and FIG. 8, rotor 36 rotates in rotation direction R. The outside diameter of rotor 81 increases toward pin 82.

Accordingly, in the state shown in FIG. 9, divisions 45 of rotor 36 are pushed out by rotor 81. The pushed out divisions 45 are contained in ring-shaped recess 48.

Even when divisions 45 are pushed out, retraction face 43 and divisions 45 are not in contact with each other, with a gap lying between retraction face 43 and the outer circumferential faces of divisions 45. At the time when divisions 45 are pushed out while rotor 36 is rotating, power pin 22 has not entered elastic member 35. Accordingly, as shown in FIG. 7, elastic member 35 is separated from cylindrical face 42.

Thus, elastic member 35 is separated from cylindrical face 42, and divisions 45 are not in contact with retraction face 43. Therefore, elastic member 35 and rotor 36 can easily rotate in rotation direction R.

As a result, elastic member 35 and rotor 36 rotate in rotation direction R before power pin 22 is inserted into power terminal 12. In the present embodiment, in particular, a force applied by the user to insert plug 3 into connector 2 is used to rotate elastic member 35. Thus, elastic member 35 can be forced to rotate even with a foreign substance in female pin 34.

Figure 10:
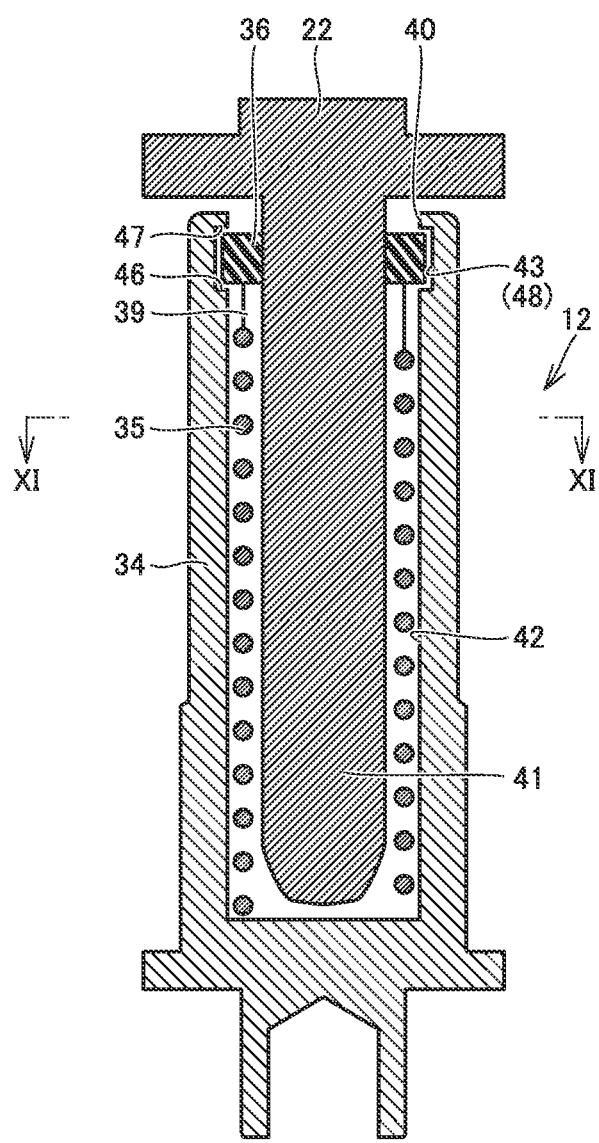
FIG. 10 is a cross-sectional view showing a state in which power pin 22 is inserted in power terminal 12.
Figure 11:
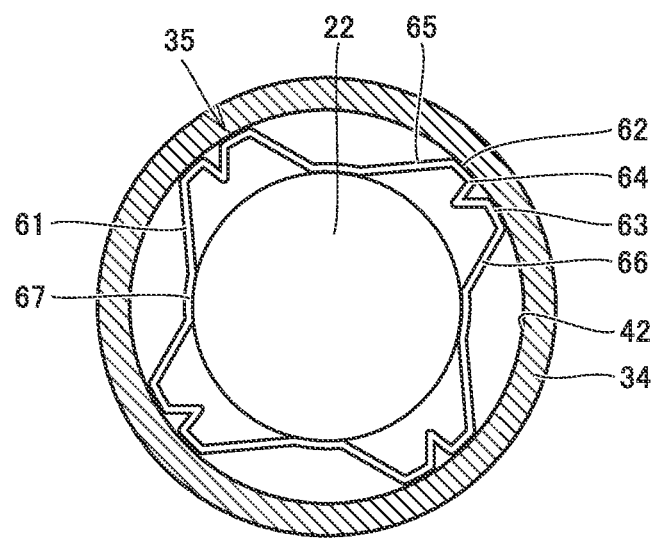
FIG. 11 is a cross-sectional view taken along line XI-XI shown in FIG. 10.

FIG. 10 is a cross-sectional view showing a state in which power pin 22 is inserted in power terminal 12. FIG. 11 is a cross-sectional view taken along line XI-XI shown in FIG. 10.

When power pin 22 is inserted in power terminal 12, power pin 22 enters elastic member 35.

At this time, as shown in FIG. 11, elastic member 35 is pushed out by power pin 22. Specifically, inside arc-shaped portions 67 of unit rings 60 are pushed out by the circumferential face of power pin 22.

Accordingly, projecting portions 61 also move radially outward. At this time, narrow portions 64 deform to stretch. Further, outside arc-shaped portions 62 and outside arc-shaped portions 63 are pressed against cylindrical face 42 of female pin 34.

Thus, power pin 22 and elastic member 35 are in contact with each other at a plurality of inside arc-shaped portions 67. Also, elastic member 35 and female pin 34 are in contact with each other at a plurality of outside arc-shaped portions 62, 63. Further, since elastic member 35 includes a plurality of unit rings 60, power pin 22 and elastic member 35 are in contact with each other at multiple points, and elastic member 35 and female pin 34 are in contact with each other at multiple points.

Therefore, when an electric current flows from power pin 22 to female pin 34, the occurrence of partial concentration of the electric current can be reduced, thus preventing power pin 22 and female pin 34 from becoming high in temperature.

In FIG. 1, plug 3 is inserted into connector 2 whenever battery 5 is charged. Whenever plug 3 is inserted into connector 2, rotor 36 and elastic member 35 rotate as shown in FIG. 9. Following the rotation of elastic member 35, power pin 22 is inserted into elastic member 35 as shown in FIG. 11.

As a result, the contact points between elastic member 35 and power pin 22 vary along the circumferential face of power pin 22 whenever plug 3 is inserted into connector 2. Thus, when power pin 22 is repeatedly inserted into power terminal 12, the contact points between the circumferential face of power pin 22 and elastic member 35 are not at a fixed position. This can prevent wear on particular points on the circumferential face of power pin 22.

Also, whenever power pin 22 is inserted into power terminal 12, elastic member 35 rotates in rotation direction R relative to female pin 34. Thus, the contact points between elastic member 35 and female pin 34 also vary in position. This can prevent wear on particular points on cylindrical face 42 of female pin 34.

In the above description, the configuration of power terminal 12 of connector 2 and power pin 22 of plug 3 are described. Power terminal 13 is configured similarly to power terminal 12, and power pin 23 is configured similarly to power pin 22.

Therefore, with repeated insertion of power pin 23 into power terminal 13, the female pin in power pin 23 and the circumferential face of power pin 23 can also be prevented from wearing.

In the above embodiment, rotor 36 is formed by a plurality of divisions 45 in a ring shape and is configured to radially stretch when power pin 22 is inserted. However, the configuration of rotor 36 is not limited to this.

For example, rotor 36 may be formed by one division 45. In this case, the one division 45 has contact face 54. When contact face 85 formed on power pin 23 comes in contact with this contact face 54, elastic member 35 rotates in rotation direction R.

If rotor 36 has a ring shape, rotor 36 may be made of, for example, a material elastically deformable in the radial direction, so that rotor 36 can elastically deform to increase in diameter when power pin 22 is inserted.

The above embodiment describes a case in which connector 2 uses a female pin structure of power terminal 12, 13, and in which plug 3 uses a male pin structure of power pin 22. However, plug 3 may use a female pin structure like power terminal 12, 13, and connector 2 may use a male pin structure like power pin 22.

Although an embodiment of the present disclosure has been described, it should be understood that the embodiment disclosed herein is by way of example in every respect, not by way of limitation. The scope of the present disclosure is defined by the terms of the claims, and is intended to include any modification within the meaning and scope equivalent to the terms of the claims.

What is claimed is:

1. A terminal structure in which a first terminal is insertable in a second terminal,
   the first terminal comprising:
     a pin; and
     a first rotor provided at an end of the pin,
   the second terminal comprising:
     a female pin including a receptacle in which the pin is insertable;
     a hollow elastic member contained in the receptacle and rotatable along an inner circumferential face of the receptacle; and
     a second rotor provided at an end of the elastic member,
   the pin and the first rotor being configured to be inserted in the elastic member when the pin and the first rotor are moved in an insertion direction,
   the first rotor having an outer circumferential face including a first contact face extending along a circumferential face of the first rotor as the first contact face extends in the insertion direction,
   the second rotor including a second contact face configured to come in contact with the first contact face,
   the first contact face being configured to come in contact with the second contact face when the pin and the first rotor are moved in the insertion direction,
   the second rotor and the elastic member being configured to rotate circumferentially when the first rotor is moved in the insertion direction while the first contact face and the second contact face are in contact with each other.

2. The terminal structure according to claim 1, wherein
   the second rotor has a ring shape,
   the second contact face is formed on an inner circumferential face of the second rotor,
   the second rotor is configured to deform to stretch when the pin is inserted therein, and
   while the pin is inserted in the second rotor, a gap is defined between the second rotor and an inner circumferential face of the female pin.

\* \* \* \* \*

UNITED STATES PATENT AND TRADEMARK OFFICE
CERTIFICATE OF CORRECTION

PATENT NO. : 10,879,640 B2  
APPLICATION NO. : 16/578843  
DATED : December 29, 2020  
INVENTOR(S) : Kunihiko Arai Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor, city, delete "Owariasahi" and insert --Owariasahi-shi Aichi-ken--, therefor.

Item (73), assignee, city, delete "Toyota" and insert --Toyota-shi Aichi-ken--, therefor.

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*